United States Patent Office 2,952,556
Patented Sept. 13, 1960

2,952,556

PROTECTIVE COATING COMPOSITIONS FROM ALIPHATIC CONDENSED POLYUNSATURATED FATTY ALCOHOLS AND THEIR ESTERS

Lyle E. Gast, John C. Cowan, and Howard M. Teeter, Peoria, Ill., assignors to the United States of America as represented by the Secretary of Agriculture No Drawing. Filed July 31, 1958, Ser. No. 752,385

3 Claims. (Cl. 106—287)

(Granted under Title 35, U.S. Code (1952), sec. 266)

A non-exclusive, irrevocable, royalty-free license in the invention herein described, throughout the world for all purposes of the United States Government, with the power to grant sublicenses for such purposes, is hereby granted to the Government of the United States of America.

This invention relates to protective coating compositions prepared by the condensation of polyunsaturated fatty alcohols in the presence of an alkaline catalyst and boron compounds. The polyunsaturated alcohols used in the preparation of these coating compositions were mixtures or oleyl, linoleyl and linolenyl alcohols derived from drying and semi-drying oils such as linseed, soybean and safflower oils.

Esters of the condensed polyunsaturated alcohols are prepared by reacting the condensed alcohols with mono- and dicarboxylic acids, particularly acrylic acid, sorbic acid, maleic acid and soybean oil fatty acids, in the presence of an acid catalyst.

More specifically, the condensed alcohols and their esters prepared by the above reactions are obtained by heating polyunsaturated fatty alcohols derived from drying and semi-drying oils containing oleic, linoleic, linolenic or other unsaturated fatty alcohols in the presence of an alkaline catalyst and a boron compound. The produced condensed alcohols are yellow oils insoluble in water but soluble in organic solvents. They are further characterized by molecular weights of 600 to 800, iodine values of 80 to 95, hydroxyl content of 2.5 to 3.5 percent, low free fatty acid content and absence of carbonyl groups.

These condensed alcohols and esters have the unexpected property that they can be baked under suitable conditions to form hard tack-free films which show good resistance to acids, alkalis, detergents, solvents and water.

The following examples illustrate the preparation of the unsaturated condensed alcohols:

EXAMPLE 1

A mixture of 268 g. (1 mole) soybean alcohols, potassium hydroxide (0.30 mole) and boric anhydride (0.15 mole) was placed in a 1000 ml. round bottom flask fitted with a stirrer, thermometer, nitrogen inlet tube and a large diameter outlet tube. The contents were heated rapidly with stirring to 300° C. Evolution of water occurred at 120–150° C. and was removed immediately from the reactor by distillation through the outlet tube. A rapid evolution of gas occurred at 170° C. After this no other products were evolved except an occasional small quantity of water. The reaction mixture was held at 290–310° C. for 2–6 hours during which time the color varied from brown at the beginning to light yellow at the end of the heating period. Some soybean alcohol distilled through the outlet tube during the heating period. The product was dissolved in benzene, washed free of alkali and dried by removal of the solvent under vacuum. The resulting condensed aliphatic fatty unsaturated alcohols amounted to approximately 200–230 g. Analytical data on the product obtained from 2–6 hours' heating time are as follows:

| React. Time | I.V. | Hydroxyl, Percent | Acid No. | Carbonyl $O_2$ | Visc. (Gardner) | Mol. Wt. |
|---|---|---|---|---|---|---|
| 2 | 83 | 3.45 | 6.1 | 0 | T | 600 |
| 4 | 83 | 3.28 | 6.3 | 0 | X | 765 |
| 6 | 89 | 3.60 | 5.7 | 0 | W | 650 |

EXAMPLE 2

Under conditions generally similar to those cited in Example 1, 266 g. (1 mole) of linseed alcohols, potassium hydroxide (0.3 mole) and boric anhydride (0.15 mole) were heated at 300° C. for 3 hours. This procedure gave 220 g. of condensed aliphatic polyunsaturated alcohols. I.V., 92; hydroxyl, 3.14 percent; mol. wt., 675; Gardner viscosity Y.

EXAMPLE 3

The esters of the condensed aliphatic polyunsaturated alcohols were prepared as follows:

Several esters of condensed aliphatic polyunsaturated alcohols derived from soybean and linseed oils were prepared by refluxing stoichiometric amounts of the appropriate alcoholic product and acid with p-toluene sulfonic acid (1% by weight of the charge) in toluene. After 3 hours' refluxing, the resulting esters were washed with water, sodium carbonate and finally with water until washings tested neutral. The acid values of the condensed aliphatic polyunsaturated alcohol esters were as follows:

| Ester | Condensed Polyunsaturated Alcohol | |
|---|---|---|
|  | Soybean | Linseed |
| Acrylic | 6.3 | 1.2 |
| Sorbic | 4.8 | 2.0 |
| Maleic | 13.0 | 13.3 |
| Soybean | 10.7 | 1.1 |

Films of condensed aliphatic polyunsaturated alcohols derived from soybean and linseed oils and their sorbic, acrylic, maleic and soybean esters were prepared by dissolving 1 g. of the condensed aliphatic polyunsaturated alcohol or ester in 3 grams of toluene containing cobalt naphthenate drier. These compositions can be baked for 1 hr. at 150° C. or for 20 min. at 200° C. to form hard tack-free films. Hardness and solvent resistance of these films are shown in Tables I and II. The films baked at 150° C. were harder than those baked at 200° C. Films show good resistance to 18 percent hydrochloric acid, 5 percent sodium hydroxide, 2 percent alkaline sulfonated hydrocarbon, 95 percent ethanol, white gasoline, ethyl acetate, acetone, benzene, and water. Chloroform produces frosting or swelling of some films within one hour.

Table I

FILM-PROPERTIES OF BAKED CONDENSED POLYUNSATURATED FATTY ALCOHOLS CONTAINING COBALT DRIER

| Test Reagent | Condensed alcohol | | | |
|---|---|---|---|---|
| | Soybean | | Linseed | |
| | 150° C.[a] | 200° C.[b] | 150° C.[a] | 200° C.[b] |
| Hardness | 3 [c] | 2 | 3 | 2 |
| 18% HCl | S(15 min.)[d] | (—)[d] | F(8 hrs.)[d] | F(8 hrs.). |
| 5% NaOH | D(15 min.)[d] | S(1½ hrs.) | F(1 hr.) | F(1¼ hrs.). |
| | | | D(8 hrs.) | |
| 2% Tide | S(3 hrs.) | S(24 hrs.) | F(4 hrs.) | F(6 hrs.). |
| 95% Ethanol | (—) | (—) | (—) | F(8 hrs.). |
| White gas | (—) | (—) | (—) | (—). |
| Ethyl acetate | F(8 hrs.) | F(8 hrs.) | (—) | (—). |
| Acetone | (—) | (—) | (—) | F(24 hrs.). |
| Chloroform | F(15 min.) | F(15 min.) | (—) | F(24 hrs.). |
| Benzene | F(1 hr.) | F(1¼ hrs.) | (—) | (—). |
| Water | F(24 hrs.) | F(8 hrs.) | (—) | F(8 hrs.). |

[a] Baked for 1 hr.
[b] Baked for 20 min.
[c] Pencil hardness test.
[d] S=Swells, F=Frosting, (—) No attack in 24 hrs.

Table II

ALKALI RESISTANCE AND HARDNESS OF FILMS OF CONDENSED ALIPHATIC POLYUNSATURATED ALCOHOL ESTERS BAKED FOR 1 HR. AT 150° C.

| Compound | Hardness [a] | 5 Percent NaOH [b] |
|---|---|---|
| Condensed aliphatic polyunsaturated alcohol derived from Soybean oil | 3 | D(15 min.).[c] |
| Sorbic ester | 4 | D(20 min.).[c] |
| Maleic ester | 4 | S(45 min.).[c] |
| Soybean ester | 3 | S(30 min.). |
| Acrylic ester | 4 | S(4 hrs.). |
| Condensed aliphatic polyunsaturated alcohol derived from Linseed oil | 3 | D(8 hrs.). |
| Sorbic ester | 2 | S(6 hrs.). |
| Maleic ester | 2 | S(22 hrs.). |
| Soybean ester | 2 | S(4 hrs.). |
| Acrylic ester | 2 | S(22 hrs.). |

[a] Pencil hardness test.
[b] Immersed for 24 hrs.
[c] D=Dissolving, S=Swelling.

We claim:

1. A process comprising heating an alcohol selected from the group consisting of oleyl alcohol, linoleyl alcohol, linolenyl alcohol, and mixtures thereof, in the presence of an alkaline catalyst and a boron compound to form a condensed alcohol having an average molecular weight of 600 to 800, an iodine value of 80 to 95, and a hydroxyl content of 2.5 to 3.5 percent, reacting the condensed alcohol with an organic acid selected from the group consisting of acrylic acid, sorbic acid, maleic acid, and soybean oil fatty acids to form an ester, and dissolving said ester in a solvent containing a cobalt napthenate drier to form a coating composition.

2. A process comprising heating an alcohol selected from the group consisting of oleyl alcohol, linoleyl alcohol, linolenyl alcohol, and mixtures thereof, in the presence of an alkaline catalyst and a boron compound to form a condensed alcohol having an average molecular weight of 600 to 800, an iodine value of 80 to 95, and a hydroxyl content of 2.5 to 3.5 percent, and dissolving said condensed alcohol in a solvent containing a cobalt napthenate drier to form a coating composition.

3. A process of forming a hard, tack free film, which is resistant to acids, alkalies, detergents, solvents and water, comprising baking a film formed from a base dissolved in a solvent containing a cobalt naphthenate drier, said base being selected from a condensed alcohol produced by heating an alcohol selected from the group consisting of oleyl alcohol, linoleyl alcohol, linolenyl alcohol, and mixtures thereof, in the presence of an alkaline catalyst and a boron compound to form a condensed alcohol having an average molecular weight of 600 to 800, an iodine value of 80 to 95, and a hydroxyl content of 2.5 to 3.5 percent, and an ester produced by reacting said condensed alcohol with an acid selected from the group consisting of acrylic acid, sorbic acid, maleic acid, and soybean oil fatty acids.

References Cited in the file of this patent

UNITED STATES PATENTS

| | | |
|---|---|---|
| 2,129,665 | Barrett et al. | Sept. 13, 1938 |
| 2,137,616 | Hann | Nov. 22, 1938 |
| 2,146,671 | Ellis | Feb. 7, 1939 |
| 2,773,780 | Koenecke et al. | Dec. 11, 1956 |
| 2,836,628 | Miller | May 27, 1958 |
| 2,861,110 | Herzenberg et al. | Nov. 18, 1958 |

FOREIGN PATENTS

| | | |
|---|---|---|
| 479,965 | Germany | July 29, 1929 |
| 164,026 | Austria | Sept. 26, 1949 |

OTHER REFERENCES

Sulzbacher: J. Appl. Chem., December 5, 1955, pp. 637–641.

UNITED STATES PATENT OFFICE
CERTIFICATE OF CORRECTION

Patent No. 2,952,556            September 13, 1960

Lyle E. Gast et al.

It is hereby certified that error appears in the printed specification of the above numbered patent requiring correction and that the said Letters Patent should read as corrected below.

Column 2, line 15, in the table, third column thereof, under the heading, "Hydroxyl, Percent", last line, for "3.60" read -- 2.60 --.

Signed and sealed this 11th day of April 1961.

(SEAL)
Attest:
ERNEST W. SWIDER
Attesting Officer

ARTHUR W. CROCKER
Acting Commissioner of Patents